United States Patent
Blom et al.

(10) Patent No.: US 6,523,804 B1
(45) Date of Patent: Feb. 25, 2003

(54) METALLIC BUILDING ELEMENT FOR OPTOELECTRONICS

(75) Inventors: Claes Blom, Skänninge (SE); Christian Vieider, Sollentuna (SE); Olov Larsson, Östersund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/375,376

(22) Filed: Aug. 17, 1999

(30) Foreign Application Priority Data

Aug. 18, 1998 (SE) .............................................. 9802751

(51) Int. Cl.⁷ ................................................ B22C 1/14
(52) U.S. Cl. ....................... 249/115; 249/116; 249/119; 428/615; 428/622; 428/680
(58) Field of Search ................................. 249/129, 135, 249/160, 114.1, 115, 116, 119; 205/70; 427/135; 106/38.2; 216/2, 12, 39; 428/615, 622, 680; 164/6

(56) References Cited

U.S. PATENT DOCUMENTS

| | | | | |
|---|---|---|---|---|
| 4,411,057 A | | 10/1983 | Duda et al. ................ 29/569 L |
| 5,378,583 A | * | 1/1995 | Guckel et al. .............. 430/325 |
| 5,412,265 A | * | 5/1995 | Sickafus ............... 310/40 MM |
| 5,483,387 A | * | 1/1996 | Bauhahn et al. ............. 359/885 |
| 5,858,622 A | * | 1/1999 | Gearhart ...................... 430/315 |
| 6,094,116 A | * | 7/2000 | Tai et al. ..................... 200/181 |
| 6,163,957 A | * | 12/2000 | Jiang et al. ..................... 29/852 |
| 2001/0014409 A1 | * | 8/2001 | Cohen ......................... 428/606 |

FOREIGN PATENT DOCUMENTS

| | | | |
|---|---|---|---|
| DE | 4212208 | 10/1993 | |
| JP | 1-225789 | * 9/1989 | ............ C25D/1/00 |
| JP | 02030786 A | * 2/1990 | ........... C25D/1/100 |
| WO | 94/16348 | 7/1994 | |
| WO | 97/36201 | 10/1997 | |
| WO | 98/26885 | 6/1998 | |

* cited by examiner

Primary Examiner—Allan Olsen
(74) Attorney, Agent, or Firm—Burns, Doane, Swecker & Mathis, L.L.P.

(57) ABSTRACT

A method of patterning metallic building elements, and also to a metallic building element, where the measuring accuracy achieved can lie in the sub-micrometer range is disclored. Starting from a silicon master or original that can be etched to sub-micrometer precision and then plated with a metal, such as nickel, on the silicon surface, there can be produced a nickel shim where precision and surface fineness can lie in the sub-micrometer range. Subsequent to removal of the silicon master, a photo-sensitive material can be used in liquid form or in film form to create mould cavities that reach down to the nickel shim. These cavities can then be metal-plated to provide a building element of higher precision in three dimensions.

4 Claims, 1 Drawing Sheet

FIG. 1A
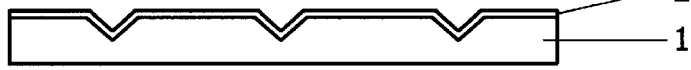
FIG. 1B
FIG. 1C
FIG. 1D
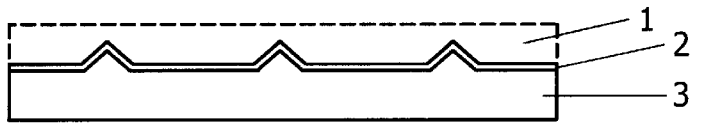
FIG. 1E
FIG. 1F
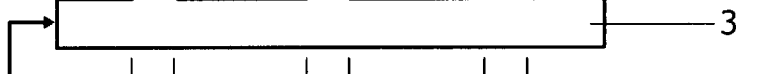
FIG. 1G
FIG. 1H
FIG. 1I
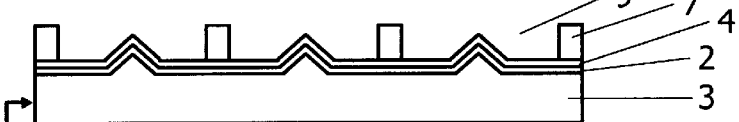
FIG. 1J
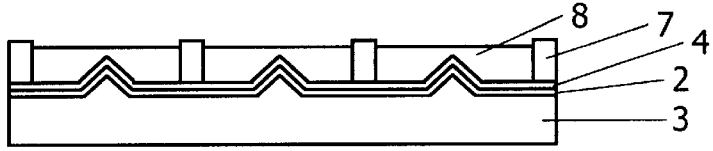
FIG. 1K
FIG. 1L
FIG. 1M
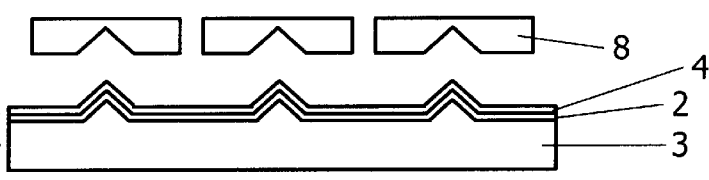

METALLIC BUILDING ELEMENT FOR OPTOELECTRONICS

This application claims priority under 35 U.S.C. §§119 and/or 365 to 9802751-9 filed in Sweden on Aug. 18, 1998; the entire content of which is hereby incorporated by reference.

FIELD OF INVENTION

The present invention relates to a method of patterning metallic building elements and to a patterned metallic building element, said building element being produced in accordance with the method of patterning metallic building elements, wherein the measurement accuracy obtained can lie in the sub-micrometer range. The building elements produced in accordance with the method may be used, among other things, as carriers for optoelectrical and electrical god components, and fibers and waveguides. The metallic building elements may also be used as micromechanical building blocks or as parts of a mould cavity for injection moulding or compression moulding purposes.

BACKGROUND

The technique at present used for mounting optoelectric laser chips in low-cost applications most often includes soldering of a chip to a ceramic or silicon carrier. Alignment between the optical active part of a laser and the core of fiber can be achieved by virtue of the possibilities of etching silicon with great precision and the use of a technique in which the laser is firmly soldered and aligned with the aid of the surface tension forces present in a solder melt. Some sort of gluing technique is normally used, for instance, to fasten pin diodes to a carrier. Optical mirrors produced by etching in silicon and metallizing the surface are often used to reflect light from a fiber to a pin diode.

When an optoelectric laser chip is to be mounted on a ceramic carrier or a silicon carrier, there often arises the problem of dissipating heat generating in the chip. Varying chip temperature can, in operation, influence the transmitted wavelength. An excessively high operating temperature can also shorten the useful life of the chip. Furthermore, ceramic and silicon carriers often demand a high price, due to the relatively complicated manufacturing processes involved.

SUMMARY

The technique described in accordance with the invention enables the cost-effective production of building elements that can be used either free-standing or as a substantial, pattern-creating part in a mould cavity intended for injection moulding or compression moulding purposes. The technique can be used to create metallic carriers that have low thermal resistance and good electrical conductivity, with the intention of preventing damage to electrical and optoelectrical chips, such as lasers, due to high or varying temperatures.

With a starting point from a silicon original or master, which can be etched to sub-micrometer precision and then plated with a metal, such as nickel, on the silicon surface, it is possible to produce a nickel shim with a precision and a surface fineness that will still lie in the sub-micrometer range. If necessary, the rear side of the shim can then be made flat prior to separating silicon from nickel. Subsequent to removing the silicon master, a photo-sensitive material, in liquid form or in film-form, can be used to create cavities that reach down to the nickel shim. These cavities can then be metallized, to form three-dimensional building elements of high precision.

These metal precision elements can then be used, for instance, for effectively conducting away heat from lasers or other heat-generating chips. The precision, surface fineness and measurement accuracy that can be achieved with the method also enable optoelectrical, components, such as, e.g., lasers with optical single-mode fibers and sharp optical mirrors to be aligned. The method also provides building elements that can conduct electric current, which enables three-dimensional electric conductors and electrodes to be produced to a specified thickness. The template or form produced in accordance with the aforedescribed method can also be used repeatedly in plating cycles, therewith contributing to low-cost production of the plated building elements.

The invention will now be described in more detail with reference to a preferred embodiment thereof and also with reference to the accompanying drawings.

BRIEF DESCRIPTION OF THE DRAWINGS

FIG. 1a is a cross-sectional view of a micro-worked silicon plate.

FIG. 1b is a cross-sectional view of the patterned silicon plate covered with a thin metal film.

FIG. 1c is a cross-sectional view of the coated silicon plate coated with a further metal layer.

FIG. 1d is a cross-sectional view of the coated silicon plate where the metal layer coating in FIG. 1c has been levelled or smoothed-off.

FIG. 1e is a cross-sectional view of metallic layers that remain subsequent to the removal of the silicon plate.

FIG. 1f is a cross-sectional view of the remaining metal layers covered with a separation layer.

FIG. 1g is a cross-sectional view of the remaining metallic layers with the separation layer laminated with a photosensitive material.

FIG. 1h is a cross-sectional view of the metallic layers according to FIG. 1g exposed to light with the aid of a photomask.

FIG. 1i is a cross-sectional view of the metallic layers according to FIG. 1h with dissolved parts.

FIG. 1j is a cross-sectional view of the metallic layers according to FIG. 1i with metal-filled cavities.

FIG. 1k is a cross-sectional view of the metallic layers according to FIG. 1j with remaining photosensitive material etched away.

FIG. 1l is a cross-sectional view of various separated, released and therewith formed building elements.

FIG. 1m is a cross-sectional view of remaining metallic layers that can be reused as moulds or templates according to FIG. 1g.

DETAILED DESCRIPTION

FIG. 1a illustrates a micro-worked silicon plate 1. The resultant pattern can be obtained in one or more of the following ways: dry etching, wet etching, laser processing or spark processing.

FIG. 1b shows how a thin metal layer 2, a so-called start layer, has been sputtered or vaparized on the patterned silicon plate 1 to enable subsequent initiation of a plating process.

FIG. 1c shows how a metal 3, preferably nickel, has been plated on the thin metal layer 2 on the silicon plate 1, to provide a so-called nickel shim on the start layer.

FIG. 1d shows how the nickel shim 3 firmly seated on the silicon plate 1 has been levelled or smoothed by some mechanical process, for instance by smooth grinding or polishing.

FIG. 1e shows how the silicon plate 1 and the nickel shim 3 have been separated from one another after being reversed.

FIG. 1f shows how the nickel shim 3 has been coated with a separation layer 4 on the existing start layer 2, said separation layer enabling separation in a later stage, as described hereinafter with reference to FIG. 1l, but does not prevent plating, see hereinafter with reference to FIG. 1j.

FIG. 1g shows how the nickel shim 3 with layers 2 and 4 has been laminated with a photo-sensitive material 5.

FIG. 1h shows how selective parts of the photo-sensitive material 5 have been exposed to light, with the aid of a so-called photomask 6.

FIG. 1i shows how the photo-sensitive material has been developed, wherewith those parts that have been exposed to light have been dissolved in a developer to form cavities 9, leaving parts of non-exposed photo-sensitive material 7. If a negative photo-sensitive material has been used, non-exposed parts will dissolve in the developer.

FIG. 1j shows the mould cavities plated with a selected metal, to form building elements 8.

FIG. 1k shows how remaining non-exposed photo-sensitive material has been dissolved with the aid of a chemical suitable to this end, therewith leaving building elements on the separation layer of the nickel shim.

FIG. 1l shows how the individual, plated building elements have been released with the aid of the earlier provided separation layer.

FIG. 1m shows how the individual, plated building elements 8 have been released from the nickel shim 3 with the aid of the separation layer 4. The nickel shim can now be reused and coated with photo-sensitive material, as indicated with the arrow marking from FIG. 1m to FIG. 1g.

Etching away of the photo-sensitive material 7 to free the created building elements, as described above with reference to FIG. 1k, can be excluded in certain applications, and a production cycle may run in accordance with the arrow marking from the state in FIG. 1m to the state in FIG. 1i, where renewed plating can take place. Plated electrical parts, so-called electrodes, can be created on the plated basic structures, by using a slightly different sequence of operations than that described, but with the same basic content.

It will be understood that the invention is not restricted to the aforedescribed, illustrated embodiments thereof, and that modifications can be made within the scope of the following Claims.

What is claimed is:

1. An apparatus for repeatedly producing metallic optical building elements with patters, the apparatus comprising:
    a metallic shim formed from a patterned silicon master to have sub-micrometer precision and surface fineness, the shim having a patterned side;
    a thin metal layer obtained from a mating surface of the silicon master, the thin metal layer disposed on the patterned side of the shim;
    a separation layer coated on the thin metal layer; and
    a photosensitive material laminated upon the separation layer and selectively removed with a photomask and exposure to light energy to form cavities so that the apparatus is delimited with unexposed photosensitive material on the separation layer;
    wherein the formed cavities having the separation layer are adapted to accept metal plating to form the metallic optical building elements with patterns that correspondingly mate the formed metal pattern in each cavity.

2. The apparatus according to claim 1, wherein said metallic optical building elements are separable from the formed metal pattern and wherein said cavities are reusable to form new building elements.

3. The apparatus according to claim 1, wherein said metallic shim is nickel.

4. The apparatus according to claim 1, wherein the metallic optical building elements form metal patterned carriers, said metal patterned carriers being separable from the formed metal pattern for individual use as optofiber carriers or micromechanical building elements and wherein said cavities can be recreated and reused to form new metal patterned carriers.

* * * * *